(12) United States Patent
Kubota et al.

(10) Patent No.: US 8,475,605 B2
(45) Date of Patent: Jul. 2, 2013

(54) SURFACE LAYER-HARDENED STEEL PART AND METHOD OF MANUFACTURING THE SAME

(75) Inventors: Manabu Kubota, Tokyo (JP); Tatsuro Ochi, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/258,340

(22) PCT Filed: Feb. 18, 2011

(86) PCT No.: PCT/JP2011/053517
§ 371 (c)(1),
(2), (4) Date: Sep. 21, 2011

(87) PCT Pub. No.: WO2011/114836
PCT Pub. Date: Sep. 22, 2011

(65) Prior Publication Data
US 2012/0018050 A1    Jan. 26, 2012

(30) Foreign Application Priority Data

Mar. 19, 2010    (JP) ................ P2010-064880

(51) Int. Cl.
| C23C 8/32 | (2006.01) |
| C23C 8/22 | (2006.01) |
| C22C 38/60 | (2006.01) |
| C22C 38/08 | (2006.01) |
| C22C 38/18 | (2006.01) |
| C22C 38/22 | (2006.01) |
| C22C 38/16 | (2006.01) |
| C22C 38/06 | (2006.01) |

(52) U.S. Cl.
USPC ........... 148/219; 148/319; 148/318; 148/226; 420/87; 420/103; 420/104; 420/84; 420/105; 420/89; 420/112

(58) Field of Classification Search
USPC ............ 148/218, 219, 318, 319, 226; 420/87, 420/103, 104, 84, 105, 89, 112
See application file for complete search history.

(56) References Cited

U.S. PATENT DOCUMENTS
6,569,267 B1    5/2003    Nakamura et al.
2001/0001396 A1    5/2001    Takayama et al.

FOREIGN PATENT DOCUMENTS
| JP | 10-176219 A | 6/1998 |
| JP | 3033349 B2 | 4/2000 |
| JP | 2002-339054 A | 11/2002 |
| JP | 2002-356738 A | 12/2002 |
| JP | 2005-48270 A | 2/2005 |
| JP | 2005-273759 A | 10/2005 |
| JP | 2006-328484 A | 12/2006 |
| JP | 2007-246941 A | 9/2007 |
| JP | 4022607 B2 | 12/2007 |

OTHER PUBLICATIONS

International Search Report with English translation dated May 17, 2011, for Application No. PCT/JP2011/053517.

*Primary Examiner* — Jessee R. Roe
(74) *Attorney, Agent, or Firm* — Birch, Stewart, Kolasch & Birch, LLP (57) ABSTRACT

In the steel for a surface layer hardening which is treated with carburizing in a temperature range of 800° C. to 900° C., chemical composition thereof contains, by mass %, C: 0.10% to 0.60%, Si: 0.01% to 2.50%, Mn: 0.20% to 2.00%, S: 0.0001% to 0.10%, Cr: 2.00% to 5.00%, Al: 0.001% to 0.50%, N: 0.0020% to 0.020%, P: 0.001% to 0.050%, and O: 0.0001% to 0.0030%; the remaining portion thereof includes Fe and unavoidable impurities; and the total amount of Cr, Si, and Mn satisfies, by mass %, $2.0 \leq Cr+Si+Mn \leq 8.0$.

14 Claims, 5 Drawing Sheets

SURFACE LAYER-HARDENED STEEL PART AND METHOD OF MANUFACTURING THE SAME

TECHNICAL FIELD

The present invention relates to steel for a surface layer hardening treatment, a surface layer-hardened steel part, and a method of manufacturing the same.

Priority is claimed on Japanese Patent Application No. 2010-064880, filed Mar. 19, 2010, the content of which is incorporated herein by reference.

BACKGROUND ART

Most power transmission parts (for example, a gear, a bearing, a CVT sheave, a shaft, and the like) used for automobiles, construction machines, farm machines, electricity generating-wind turbines, other industrial machines and the like are used after being subjected to a surface hardening treatment to improve, for example, fatigue characteristics and abrasion resistance of the parts. Among a plurality of known surface hardening treatments, a carburizing treatment is superior to other surface hardening treatments in terms of the surface hardness, depth of hardened layer, productivity, and the like, so the carburizing treatment is applied to numerous types of parts.

For example, in a general manufacturing method of the gear and bearing parts, by using medium carbon alloy steel such as SCM 420, SCR 420, SNCM 220, and the like specified by JISG 4053, a mechanical processing is performed to obtain a predetermined shape through a hot forging, a cold forging, cutting, or through a combination thereof, and then the carburizing treatment or a carbonitriding treatment is performed.

The fatigue fracture of a carburized gear is classified roughly into bending fatigue (dedendum fatigue) and tooth surface fatigue (pitting or the like). In order for the gear parts to obtain durability, both the above types of fatigue strength need to be improved. Among these, it is known that the bending fatigue strength can be improved by improving the surface microstructure (reducing a grain boundary-oxidized layer, and an incompletely quenched layer), and can be drastically improved by performing shot peening.

On the other hand, the tooth surface fatigue strength can hardly be improved even if the shot peening is performed, so the improvement of the tooth surface fatigue strength is anticipated. Moreover, since a high contact pressure is applied not only to the gear but to the CVT sheave and bearings, there is an eager request for the improvement of surface fatigue such as tooth surface fatigue and rolling fatigue.

Recently, it has been reported that hardness at 300° C. (or hardness after tempering at 300° C., which is referred to as tempered hardness at 300° C. hereinafter) should be increased in order to improve effectively the tooth surface fatigue strength, since the temperature of the tooth surface rises up to about 300° C. while using the gear.

It has been suggested that the tempered hardness at 300° C. of steel is improved by increasing the amount of Si or Cr added. However, even if the chemical composition of steel is optimized, the improvement of the tempered hardness at 300° C. has a limit and its drastic improvement is difficult. Therefore, another technique for the improvement is anticipated.

Recently, as a technique of drastically improving the tempered hardness at 300° C., a "high carbon carburizing technique (which is also referred to as high concentration carburizing)" which intentionally precipitates cementite on the surface of a carburized part has been suggested. In the general carburizing treatment, the atmospheric carbon potential (hereinafter, referred to as C. P.) is set to about 0.70% to 0.90%, the carbon content in the surface layer portion of the part is controlled to be about 0.80%, and then quenching is performed. As a result, the microstructure in the surface layer of the part is controlled into a martensite phase containing about 0.80% of carbon by the treatment.

On the contrary, in the high carbon carburizing technique, by setting the C.P. to a higher level (a level equal to or higher than eutectoid carbon content) compared to the general treatment, the carburizing treatment which results that the carbon content in the surface exceeds an Acm composition is performed. As a result, since cementite precipitates and disperses in the surface layer portion, a microstructure which has the cementite dispersed in martensite is finally obtained. This technique is also called CD carburizing: carbide dispersion carburizing.

"Carbon potential" is a term indicating the carburizing ability of the atmosphere in which steel is heated. The basic definition of carbon potential is "carbon content of the steel surface which is in equilibrium with a gas atmosphere after the steel is carburized by heating at a certain temperature under the gas atmosphere." Here, in the case that carburizing is conducted under a condition such that the value of the carbon potential exceeds the Acm composition of carburized steel, the carbon potential means the hypothetical carbon content of the steel surface where cementite precipitation does not occur. In this case, the carbon potential is not necessarily identical to the actual amount of solute carbon of the steel surface.

Exposed to a high temperature in use as the part, martensite is tempered and softened. On the other hand, carbide such as cementite or the like is much harder than martensite and not easily softened even when the temperature rises. Consequently, if a large amount of the carbide can be dispersed in steel, it is possible to drastically improve the tempered hardness at 300° C. described above. This technique is hopeful method of improving the surface fatigue strength such as tooth surface fatigue strength, rolling fatigue strength, or the like.

However, when the high carbon carburizing is performed on medium carbon alloy steel such as SCM 420, SCR 420, SNCM 220, and the like specified by JISG 4053, coarse cementite precipitates inevitably along the austenite grain boundary (so-called pro-eutectoid cementite) and becomes a site where fatigue cracks initiate and a path of propagating the cracks. Therefore, the bending fatigue strength decreases and the tooth surface fatigue strength is unstable. As a result, the problem such that the expected fatigue strength is not obtained occurs.

For this reason, in the general high carbon carburizing, the high carbon carburizing is performed at a relatively high temperature (primary carburizing) at first, and then the carburized steel is temporarily cooled to around room temperature at a sufficiently rapid cooling rate so as not to precipitate the pro-eutectoid cementite. Thereafter, the carbide precipitating treatment which is reheat of the carburized steel to a temperature range coexisting austenite and cementite is carried out, and then quenching is performed. This treatment is generally called "secondary quenching".

For example, Patent Document 1 suggests a method of performing the induction hardening as the secondary quenching. Patent Document 2 suggests a method to disperse carbide finely by specifying a heating pattern of the secondary quenching. However, the secondary quenching not only raises the cost of the heat-treatment but worsens a performance of the part. That is, the shape change of the part caused by the heat-treatment accumulates and increases inevitably by repetition of the heat-treatment. Therefore, the dimensional accuracy of the part deteriorates.

For example, if the dimensional accuracy of parts of the gear and bearing deteriorates, the part causes an increase in noise and vibration, because the parts are put into a unit such as a transmission unit and the unit is driven. In order to restore the dimensional accuracy of the parts, after the secondary quenching, cutting work is performed again in some cases (finishing processing).

However, since the cutting work is performed on the part including a surface layer portion which is extremely hardened by the high carbon carburizing, the cutting work is very difficult and inefficient, and the cost rises. Moreover, since a portion of the surface layer is removed through the finishing processing, it is necessary to form an extra hardened layer as deep as the cut portion. Accordingly, the carburizing treatment should be performed for many hours, and therefore, the productivity of the carburizing treatment decreases.

That is, in the current technique, although the secondary quenching should be performed to obtain the desired performance, the secondary quenching causes various problems, and as a result, a cost rises significantly.

In order to solve the above problems, materials for high carbon carburizing and a method of high carbon carburizing treatment have been suggested.

Patent Document 3 and Patent Document 4 suggest a method of manufacturing the part applied to high contact pressure in which a surface carbon content in the carburizing treatment is specified, the carburizing treatment is performed in a temperature range calculated by a formula specified by chemical composition, and a diffusion treatment is performed at high temperature which relates to the carburizing temperature after the carburizing treatment.

However, since the diffusion treatment is performed at a temperature higher than the carburizing temperature, the carbide is coarsened. Therefore, this method is unsuitable as a treatment replacing the secondary quenching. In addition, in the treatment pattern disclosed as an example of the invention of the above patent literature, steel is cooled rapidly to a point $A_1$ or lower during the carburizing treatment. This is substantially the same treatment as the secondary quenching, and this method cannot prevent the deterioration of the dimensional accuracy of the parts.

CITATION LIST

Patent Document

[Patent Document 1] Japanese Unexamined Patent Application, First Publication No. 2005-48270
[Patent Document 2] Japanese Unexamined Patent Application, First Publication No. 2002-356738
[Patent Document 3] Japanese Unexamined Patent Application, First Publication No. 2001-98343
[Patent Document 4] Japanese Patent (Granted) Publication No. 4022607

SUMMARY OF INVENTION

Technical Problem

An object of the invention is to provide steel for a surface layer hardening treatment which has a high tooth surface fatigue strength and can produce parts in which the increase of the shape change (the deterioration of dimensional accuracy of parts) caused by secondary quenching is prevented, a surface-hardened steel part, and a method of manufacturing the same.

Solution to Problem

The present invention solves the above problem by setting a higher C.P. in carburization compared to a general treatment, and dispersing the carbide finely in a carburized layer without performing the secondary quenching.

The distinction between a high carbon carburizing treatment and a normal carburizing treatment is ambiguous, and neither a strict distinction nor a general definition exists. In the present invention, the high carbon carburizing treatment is defined as "a carburizing treatment in which a C.P. keeps 0.90% or more through 50% or more of the total carburizing treatment time."

In the present invention, a high carbon gas carbonitriding treatment is defined as "a treatment in which a process to penetrate nitrogen actively into the surface is added at any given point in time during the carburizing treatment in which a C.P. keeps 0.90% or more through 50% or more of the total carburizing treatment time."

In the present invention, steel containing 2.00% to 5.00% by mass of Cr is treated with high carbon gas carburizing or high-carbon gas carbonitriding in a temperature range of 800° C. to 900° C. Hereby, $(Cr,Fe)_{23}C_6$ and/or $(Cr,Fe)_3C$ is precipitated in a surface layer portion during the carburizing treatment, and the precipitates thereof are used as nucleuses of precipitation of cementite. As a result, by a single heat-treatment, a microstructure is obtained in which carbide (cementite, $(Cr,Fe)_{23}C_6$ and/or $(Cr,Fe)_3C$) is finely dispersed in the surface of the part.

Hitherto, in order to let the coarse carbide disperse finely, the heat-treatment including multiple heating and quenching is required. However, in the present invention, only a treatment including a single carburizing and quenching is performed. As a result, it is possible to suppress various problems caused by the increase in the number of the heat-treatment cycles, for example, an increase of the shape change of a part and an increase in heat-treatment cost. An aspect of the present invention employs the following.

(1) A steel for a surface layer hardening treatment treated with carburizing in a temperature range of 800° C. to 900° C., a chemical composition thereof comprising, by mass %, C: 0.10% to 0.60%; Si: 0.01% to 2.50%; Mn: 0.20% to 2.00%; S: 0.0001% to 0.10%; Cr: 2.00% to 5.00%; Al: 0.001% to 0.50%; N: 0.0020% to 0.020%; P: 0.001% to 0.050%; O: 0.0001% to 0.0030%; and the balance consisting of iron and unavoidable impurities, wherein a total amount of Cr, Si, and Mn satisfies, by mass %, $2.0 \leq Cr+Si+Mn \leq 8.0$.

(2) The steel for the surface layer hardening treatment of (1), wherein the chemical composition further comprises at least one of, by mass %, Ca: 0.0005% to 0.0030%; Mg: 0.0005% to 0.0030%; and Zr: 0.0005% to 0.0030%.

(3) The steel for the surface layer hardening treatment of (1) or (2), wherein the chemical composition further comprises at least one of, by mass %, Mo: 0.01% to 1.00%; B: 0.0005% to 0.0050%; Cu: 0.05% to 1.00%; and Ni: 0.05% to 2.00%.

(4) The steel for the surface layer hardening treatment of (1) or (2), wherein the chemical composition further comprises at least one of, by mass %, V: 0.005% to 0.50%; Nb: 0.005% to 0.10%; and Ti: 0.005% to 0.50%.

(5) A surface layer-hardened steel part treated with carburizing or carbonitriding treatment, a chemical composition of a non-carburized portion of the steel part comprising, by mass %, C: 0.10% to 0.60%; Si: 0.01% to 2.50%; Mn: 0.20% to 2.00%; S: 0.0001% to 0.100%; Cr: 2.00% to 5.00%; Al: 0.001% to 0.50%; N: 0.0020% to 0.0200%; P: 0.001% to 0.050%; O: 0.0001% to 0.0030%; and the balance consisting of iron and unavoidable impurities, wherein a total amount of Cr, Si, and Mn of the non-carburized portion of the steel satisfies, by mass %, $2.0 \leq Cr+Si+Mn \leq 8.0$; an average carbon content in a surface layer portion from the topmost surface to 50 μm in depth of a carburized layer is, by mass %, 1.00% to 6.7%; an area ratio of a carbide in the surface layer portion is 15% or more; the surface layer portion contains at least one precipitate of $(Cr,Fe)_{23}C_6$ and $(Cr,Fe)_3C$; and a reticular carbide of 10 μm or more along a prior γ austenite grain boundary is 2.5 pieces/mm$^2$ or less in the surface layer portion.

(6) The surface layer-hardened steel part of (5), wherein the chemical composition of the non-carburized portion of the steel further comprises at least one of, by mass %, Ca: 0.0005% to 0.0030%; Mg: 0.0005% to 0.0030%; and Zr: 0.0005% to 0.0030%.

(7) The surface layer-hardened steel part of (5) or (6), wherein the chemical composition of the non-carburized portion of the steel further comprises at least one of, by mass %, Mo: 0.01% to 1.00%; B: 0.0005% to 0.0050%; Cu: 0.05% to 1.00%; and Ni: 0.05% to 2.00%.

(8) The surface layer-hardened steel part of any one of (5) to (7), wherein the chemical composition of the non-carburized portion of the steel further comprises at least one of, by mass %, V: 0.005% to 0.50%; Nb: 0.005% to 0.10%; and Ti: 0.005% to 0.50%.

(9) A method for producing a surface layer-hardened steel part, the method comprising: a shape forming process of forming the steel part out of the steel for the surface layer hardening treatment of (1) or (2); a carburizing process of precipitating at least one precipitate of $(Cr,Fe)_{23}C_6$ and $(Cr,Fe)_3C$ in a carburized layer of the steel part by a gas carburizing or a gas carbonitriding treatment in which a carbon potential of a carburizing atmosphere keeps 0.90% or more through 50% or more of the total carburizing time in a temperature range of 800° C. to 900° C.; and a quenching process of quenching from a temperature at which the gas carburizing treatment or the gas carbonitriding treatment are conducted or from a temperature which is lowered below the carburizing temperature, following the carburizing process.

(10) The method for producing the surface layer-hardened steel part of (9), wherein the method further comprises: prior to the carburizing process, a pre-carburizing process in which the gas carburizing treatment or the gas carbonitriding treatment is performed on the steel part in a temperature range of 800° C. to 1100° C. under a condition where the carbon potential of the carburizing atmosphere is 0.40% to 1.20%.

Advantageous Effects of Invention

According to the present invention, it is possible to finely disperse carbide in the carburized layer of a part, even if the secondary quenching is not performed. As a result, it is possible to obtain a part having a high tooth surface fatigue strength and prevented from increasing a heat-treatment shape change (deterioration of dimensional accuracy of a part) caused by the secondary quenching, with a low cost. Therefore, the invention is very effective for increasing the frequency of rotation and transmission torque as well as the miniaturization and lightening of power transmission parts (for example, a gear, a bearing, a shaft, a CVT sheave, and the like) of automobiles and the like.

DESCRIPTION OF EMBODIMENTS

Through thorough research on various factors influencing the dispersion state of carbide in a carburized layer in a high carbon carburizing treatment, the present inventors have acquired the following knowledge.

(a) The greater the Cr content in steel, the more the carbide formed in the carburized layer during the high carbon carburizing treatment is precipitated.

(b) When the Cr content in steel is less than 2.00%, the carbide formed in the carburized layer during the high carbon carburizing treatment is mainly precipitated as coarse reticular cementite along an austenite grain boundary. On the contrary, when the Cr amount in steel is 2.00% or more, the carbide is dispersed finely as grain-like or needle-like carbide in the austenite grain.

(c) The lower the carburizing temperature, the more the carbide formed in the carburized layer during the high carbon carburizing treatment is precipitated.

(d) The lower the carburizing temperature, the finer the precipitate of the carbide formed in the carburized layer during the high carbon carburizing treatment, and the carbide is dispersed finely as grain-like or needle-like carbide in the austenite grain. Particularly, when the carburizing temperature is 900° C. or less, it is possible to obtain a microstructure in which the fine carbide is dispersed sufficiently. The reasons are as follows.

(e) The greater the amount of Cr added and the lower the carburizing temperature, the more easily the fine $(Cr,Fe)_{23}C_6$ and/or $(Cr,Fe)_3C$ is precipitated in the austenite grain in the carburized layer, and the precipitation amount further increases at the initial stage of the carburizing treatment. Moreover, at the late stage of the carburizing treatment, cementite is precipitated by using the fine precipitates as nuclei thereof. As a result, the amount of coarse reticular cementite formed along the austenite grain boundary is suppressed.

(f) When high carbon carburizing treatment is performed by a gas carburizing method, if the amount of Cr added, or the amount of Cr, Si, and Mn added is relatively large, and if the carburizing temperature is high, a Cr oxide and composite oxide of Cr, Si, and Mn are formed on the steel surface, which inhibits the diffusion of carbon to the inside of steel from the carburizing atmosphere. As a result, the carbon content in the carburized layer falls short of the target value. Therefore, the high carbon carburizing treatment cannot be performed substantially in some cases. This phenomenon is prone to occur when the carburizing temperature exceeds 900° C.

(g) After the gas high carbon carburizing treatment, by additionally performing nitriding (a so-called carbonitriding treatment) which is a treatment of adding ammonia to the heat-treatment atmosphere, the tooth surface fatigue strength can be further improved.

As described above, it is very effective to increase the amount of Cr added and to perform the high carbon carburizing treatment at a temperature lower than that (around 930° C. to 950° C.) of the conventional technique for making the carbide in the carburized layer be finely dispersed. As a result, it is possible to improve the tooth surface fatigue strength of the part without performing the secondary quenching for finely dispersing the carbide (without deteriorating the dimensional accuracy of the part).

Hereinafter, the present invention will be described in detail. First, reasons for limiting the chemical composition will be described. The content % of the components means % by mass.

C: 0.10% to 0.60%.

Carbon (C) is added to secure the hardness of the core of the part. If the amount of C added is small, the time for the carburizing treatment must be prolonged. On the other hand, if the amount of C added is in excess, workability in performing processing such as cutting and forging of the part markedly deteriorates, because the hardness of the material increases excessively. In the present invention, the amount of C needs to be in a range of 0.10% to 0.60%. The amount of C is preferably in a range of 0.15% to 0.30%.

Si: 0.01% to 2.50%

Silicon (Si) is an element which is effective for improving the tooth surface fatigue strength since Si markedly increases the resistance to temper softening of the martensite steel tempered at a low temperature like a carburized part. In the present invention, Si of 0.01% or more is added. However, if Si is excessively added, the composite oxide of Cr, Si, and Mn is formed on the steel surface during the gas carburizing, which inhibits the diffusion of carbon to the inside of the steel from the carburizing atmosphere. Therefore, the carbon content in the carburized layer falls short of the target value in some cases. In addition, if Si is excessively added, workability in performing processing such as cutting and forging of the part markedly deteriorates, because the hardness of the material increases excessively. In the present invention, the amount of Si needs to be in a range of 0.01% to 2.50%. The range of the amount of Si is preferably 0.03% to 1.50%, and more preferably 0.10% to 1.00%.

Mn: 0.20% to 2.00%

Manganese (Mn) has an effect of improving the hardenability of steel. Therefore, Mn of 0.20% or more is added to obtain the martensite structure during carburizing quenching. On the other hand, if Mn is excessively added, the composite oxide of Cr, Si, and Mn is formed on the steel surface during the gas carburizing, which inhibits the diffusion of carbon to the inside of the steel from the carburizing atmosphere. Therefore, the carbon content in the carburized layer falls short of the target value in some cases. In addition, if Mn is excessively added, the workability in performing processing such as cutting and forging of the part markedly deteriorates, because the hardness of the material increases excessively. In the present invention, the amount of Mn needs to be in a range of 0.20% to 2.00%. The amount of Mn is preferably in a range of 0.40% to 1.00%.

S: 0.0001% to 0.10%

Sulfur (S) forms MnS by bonding to Mn. As the amount of S added increases, S shows an effect of improving machinability. However, if S is excessively added, MnS becomes a path for propagating fatigue cracks, and therefore, the bending fatigue strength of a gear decreases. In addition, an excessive cost is required to limit the amount of S to 0.0001% or less. Accordingly, in the present invention, the amount of S needs to be in a range of 0.0001% to 0.10%. The amount of S is preferably in a range of 0.010% to 0.02%.

Cr: 2.00% to 5.00%

As the amount of chromium (Cr) added increases, the precipitation amount of the carbide formed in the carburized layer increases during the high carbon carburizing treatment. When the amount of Cr added exceeds a predetermined amount or more, the fine $(Cr,Fe)_{23}C_6$ and/or $(Cr,Fe)_3C$ is easily precipitated in the austenite grain in the carburized layer, and the precipitation amount also increases at the initial stage of the carburizing treatment. At the latter stage of the carburizing treatment, cementite is precipitated by using the fine precipitates as nuclei thereof. Therefore, since Cr is an element which is very effective for finely dispersing the carbide and for suppressing the coarse reticular cementite along the austenite grain boundary, a relatively large amount of Cr is added.

It is difficult to obtain the effects as described above from other additive elements instead of Cr, so Cr is the most important additive element in the present invention. On the other hand, if Cr is excessively added, the composite oxide of Cr, Si, and Mn is formed on the steel surface during the gas carburizing, which inhibits the diffusion of carbon to the inside of the steel from the carburizing atmosphere. Therefore, the carbon content in the carburized layer falls short of the target value in some cases. Moreover, if Cr is excessively added, workability in performing processing such as cutting and forging of the part markedly deteriorates, because the hardness of the material increases excessively. Accordingly, in the present invention, the amount of Cr needs to be in a range of 2.00% to 5.00%. The amount of Cr is preferably in a range of 2.00% to 3.50%, and more preferably 2.25% to 3.50%. When the amount of Cr is in the above range, in order to secure a sufficient amount of carbon in the carburized layer, it is particularly important to limit the carburizing temperature to 900° C. or less.

Al: 0.001% to 0.50%

Aluminum (Al) is an element effective for deoxidizing steel and forms AlN by bonding to N in steel. AlN functions to suppress the grain growth by pinning the austenite grain boundary, thereby preventing the microstructure from coarsening. If the amount of Al added is small, the effect cannot be obtained. And if Al is excessively added, the effect is saturated. Therefore, in the present invention, the amount of Al needs to be in a range of 0.001% to 0.50%. The amount of Al is preferably in a range of 0.020% to 0.15%. When Ti of 0.08% or more is added, the amount of Al added may be less than 0.020%, because the pinning effect becomes sufficient due to the increase in the amount of TIC.

N: 0.0020% to 0.020%

Nitrogen (N) forms AlN by bonding to Al in steel. AlN functions to suppress the grain growth by pinning the austenite grain boundary, thereby preventing the microstructure from coarsening. If the amount of N added is small, the effect cannot be obtained, and if N is excessively added, ductility in a high temperature region of 1000° C. or higher deteriorates, which causes the decrease in yield of continuous casting and rolling. Therefore, in the present invention, the amount of N needs to be in a range of 0.0020% to 0.020%. The amount of N is preferably in a range of 0.0050% to 0.018%.

P: 0.050% or less

Phosphorus (P) is segregated at the austenite grain boundary and embrittles the prior austenite grain boundary, thereby resulting in an intergranular cracking. Accordingly, it is desirable to decrease the amount of P as possible. Consequently, in the present invention, the amount of P needs to be in a range of 0.050% or less. The amount of P is preferably in a range of 0.015 or less. The lower limit of the amount of P is preferably 0.001% because an excessive cost is required to limit the amount of P to 0.001% or less.

O: 0.0030% or less

Oxygen (O) forms oxide inclusions. If the amount of O is large, large inclusions which act as a starting point of fatigue fracture increase, which causes the deterioration of fatigue characteristics. Accordingly, it is desirable to decrease the amount of O as possible. Therefore, in the present invention, the amount of O needs to be limited to 0.0030% or less. The amount of O is preferably in a range of 0.0015% or less. The lower limit of the amount of O is preferably 0.0001% because an excessive cost is required to limit the amount of O to 0.0001% or less.

Ca, Mg, and Zr: 0.0005% to 0.0030%

Calcium (Ca), Magnesium (Mg), and Zirconium (Zr) are arbitrary components which can be added to the steel for surface layer hardening treatment of the present invention as necessary. Ca, Mg, and Zr have functions to control the shape of MnS and to improve the machinability of steel by forming a protective covering for the surface of a cutting instrument during cutting. In order to obtain the effect, at least one of Ca, Mg, and Zr of 0.0005% or more may be added. On the other hand, if Ca, Mg, and Zr are added more than 0.0030%, the fatigue strength of a part is negatively influenced in some cases, because coarse oxides and sulfides are formed. Accordingly, in the present invention, at least one of Ca, Mg, and Zr may be added in a range of 0.0005% to 0.0030% respectively. The preferable range thereof is 0.0008% to 0.0020%. In a case of a steel type in which a relatively large amount of Cr is added like the invention of the present application, the hardness of the material is further improved compared to the general steel for carburizing (SCR 420, SCM 420, and the like of JIS G 4053). Consequently, if the part is formed by cutting, since the lifetime of the cutting instrument is shortened, the cost relating to cutting increases in some cases. In other words, since the lifetime of the cutting instrument can be extended by the addition of Ca, Mg, and Zr, it is effective for actual production that Ca, Mg, and Zr are added for the high carbon carburizing in the present invention.

Mo: 0.01% to 1.00%

Molybdenum (Mo) is an arbitrary component that can be added in the steel for surface layer hardening treatment of the present invention if necessary. Since Mo has an effect of improving the hardenability of steel, Mo may be added to obtain a martensite structure during carburizing quenching. Mo does not form an oxide and hardly forms a nitride under the gas atmosphere of the gas carburizing. Therefore, the Mo-added steel has an excellent property that an oxide layer, a nitride or an abnormal carburized layer resulting from the oxide or the nitride are hardly formed on the surface of the carburized layer. However, since a high cost is required to add Mo, it is not desirable to add an excessive amount of Mo. Accordingly, in the present invention, the amount of Mo may be in a range of 0.01% to 1.00%. The amount of Mo is preferably in a range of 0.10% to 0.60%.

B: 0.0005% to 0.0050%

Boron (B) is an arbitrary component that can be added to the steel for surface layer hardening treatment of the present invention as necessary. B which is dissolved in austenite as solid solution has an effect of greatly improving the hardenability of steel with a small amount thereof. Therefore, B may be added to obtain the martensite structure during the carburizing quenching. If the amount of B added is too small, the effect cannot be obtained. On the other hand, if B is excessively added, the effect is saturated. Accordingly, in the present invention, the amount of B may be in a range of 0.0005% to 0.0050%. The amount of B is preferably in a range of 0.0010% to 0.0025%.

If Nitrogen (N) of a certain amount or more exists in steel, B bonds to N and forms BN. As a result, the effect of improving the hardenability cannot be obtained in some cases, because the amount of solute B is reduced. In the case of adding B, it is preferable to simultaneously add a suitable amount of Ti and Al for fixing N.

Cu: 0.05% to 1.00%

Copper (Cu) is an arbitrary component that can be added to the steel for a surface layer hardening treatment of the present invention as necessary. Cu has an effect of improving the hardenability of steel with a small amount thereof. Therefore, Cu may be added to obtain the martensite structure during the carburizing quenching. Cu does not form an oxide or nitride under the gas atmosphere of the gas carburizing. Therefore, the Cu-added steel has a property that an oxide layer, a nitride or an abnormally carburized layer resulting from the oxide or the nitride are hardly formed on the surface of the carburized layer.

However, if Cu is excessively added, ductility in a high temperature region of 1000° C. or higher deteriorates, which causes the decrease in yield of continuous casting and rolling. Therefore, in the present invention, Cu may be added in a range of 0.05% to 1.00%. The amount of Cu is preferably in a range of 0.010% to 0.50%. If Cu is added, it is desirable to add simultaneously Ni of a half or more of the amount of Cu added to improve the ductility in the high temperature region.

Ni: 0.05% to 2.00%

Nickel (Ni) is an arbitrary component that can be added the steel for surface layer hardening treatment of the present invention as necessary. Since Ni has an effect of improving the hardenability of steel, Ni may be added to obtain the martensite structure during the carburizing quenching. Ni does not form an oxide or nitride under the gas atmosphere of the gas carburizing. Therefore, the Ni-added steel has a property that an oxide layer, a nitride, or an abnormally carburized layer resulting from the oxide or the nitride are hardly formed on the surface of the carburized layer.

However, since a high cost is required to add Ni, it is not desirable to add Ni excessively. Accordingly, in the present invention, Ni may be added in a range of 0.05% to 2.00%. The amount of Ni is preferably in a range of 0.40% to 1.60%.

V: 0.005% to 0.50%

Vanadium (V) is an arbitrary component that can be added to the steel for surface layer hardening treatment of the present invention as necessary. V forms V(C,N) by bonding to N and C in steel. V(C,N) functions to suppress the grain growth by pinning the austenite grain boundary, thereby preventing the microstructure from coarsening. If the amount of V added is small, this effect cannot be obtained, and if V is excessively added, the effect is saturated. In the present invention, V may be added in a range of 0.005% to 0.50%. The amount of V is preferably in a range of 0.50% to 0.20%.

Nb: 0.005% to 0.10%

Niobium (Nb) is an arbitrary component that can be added to the steel for surface layer hardening treatment of the present invention as necessary. Nb forms Nb(C,N) by bonding to N and C in steel. Nb(C,N) functions to suppress the grain growth by pinning the austenite grain boundary, thereby preventing the microstructure from coarsening. If the amount of Nb added is small, this effect cannot be obtained, and if Nb is excessively added, the effect is saturated. In the present invention, Nb may be added in a range of 0.005% to 0.10%. The amount of Nb is preferably in a range of 0.010% to 0.050%.

Ti: 0.005% to 0.50%

Titanium (Ti) is an arbitrary component that can be added to the steel for surface layer hardening treatment of the present invention as necessary. Ti forms Ti(C,N) by bonding to N and C in steel. Ti(C,N) functions to suppress the grain growth by pinning the austenite grain boundary, thereby preventing the microstructure from coarsening. If the amount of Ti added is small, this effect cannot be obtained, and if Ti is excessively added, the effect is saturated. In the present invention, Ti may be added in a range of 0.005% to 0.50%. The amount of Ti is preferably in a range of 0.015% to 0.15%.

$2.0\% \leq Cr+Si+Mn \leq 8.0\%$

According to the amount of each element including Cr, Si, and Mn in steel, a composite oxide of Cr, Si, and Mn is formed on the steel surface during the gas carburizing, which inhibits the diffusion of carbon from the carburizing atmosphere to the inside of the steel. Therefore, in order to secure the carbon content and to precipitate $(Cr,Fe)_{23}C_6$ and $(Cr,Fe)_3C$ in the surface layer portion of the part during the high carbon carburizing, it is desirable to limit the total amount of the three components to a certain range. In the present invention, the total amount of the three components is limited to 2.0% to 8.0%. The total amount of the three components is more preferably 3.0% to 4.5%.

In the present invention, Lead (Pb), Tellurium (Te), Zinc (Zn), Tin (Sn), and the like can be added in addition to the above components, in a range that does not diminish the effects of the present invention. Pb, Te, Zn, and Sn are arbitrary components that can be added to the steel for surface hardening treatment of the present invention as necessary. Adding these elements makes it possible to improve the machinability and the like. In order not to diminish the effect of the present invention, the upper limit of the amount of these additive components may be to Pb: 0.50% or less, Te: 0.0030% or less, Zn: 0.50% or less, and Sn: 0.50% or less.

The surface layer-hardened steel part of the present invention is obtained by performing the carburizing treatment or carbonitriding treatment on the steel for surface hardening treatment of the present invention. In the steel part, the central portion (core portion) of the part which is not influenced by the carburizing treatment or the carbonitriding treatment is hereinafter called a non-carburized portion. The chemical composition of the non-carburized portion is substantially the same as that of the steel for surface hardening treatment, which becomes the material of parts.

In the carburized layer of the steel part, the region from the surface to 50 μm in depth is called a surface layer portion. In the surface layer-hardened steel part of the present invention, the average carbon content of the surface layer portion in the carburized layer is 1.00% to 6.7% by mass. If the carbon content of the surface layer portion is less than 1.00%, the improvement of the tooth surface fatigue strength is insufficient, and at the content of 6.7%, the entire surface layer portion becomes cementite; therefore, carbon content does not come to more than 6.7%. In addition, the area ratio of carbide in the surface layer portion (region from the surface to 50 μm in depth) is 15% or more. If the area ratio of the carbide is less than 15%, the improvement of tooth surface fatigue strength is insufficient. The area ratio of the carbide is preferably in a range of 20% to 80%. The surface layer portion includes at least one of precipitates among $(Cr,Fe)_{23}C_6$ and $(Cr,Fe)_3C$ of 100 pieces or more per 100 μm$^2$.

The condition of the high carbon gas carburizing or the high carbon gas carbonitriding of the present invention may follow the above-described "the definition of the high carbon gas carburizing or the high carbon gas carbonitriding of the present invention".

For example, the carburizing may be performed with a C.P. of 0.90% or more through the whole carburizing time. The carburizing may be performed with a C.P. of 0.80% for the first half of the time and with a C.P. of 0.90% or more, which is the high carbon carburizing atmosphere, for the second half. Conversely, the carburizing may be performed with a C.P. of 0.90% or more, which is the high carbon carburizing atmosphere, for the first half of the time and with a C.P. of about 0.80% for the second half.

In this manner, by changing the C.P. variously, the fraction of carbide in the carburized layer of a part and the amount of residual austenite may be arbitrarily controlled. The higher the C.P. in the high carbon carburizing atmosphere, the easier the fine $(Cr,Fe)_{23}C_6$ and/or $(Cr,Fe)_3C$ is precipitated in the carburized layer. Consequently, it is desirable to set the C.P. to 1.0% or more, and a preferable range of the C.P. is 1.1% to 1.6%.

Although the quenching following the carburizing is generally conducted by oil cooling, salt-bath cooling, gas cooling, and the like, any of the cooling methods can be used. For example, in a case of oil cooling, the oil temperature for quenching is preferably in a range of 50° C. to 180° C. To minimize the heat-treatment shape change caused by the quenching, a low cooling rate (a high temperature of the quenching oil) is desirable. To improve the fatigue strength by minimizing an incomplete quenched layer of the surface, a high cooling rate (a low temperature of the quenching oil) is desirable.

In general, the surface layer-hardened steel part manufactured by the carburizing treatment is treated with low-temperature tempering (300° C. or lower) after the carburizing quenching. The low-temperature tempering is performed to recover the toughness of the core portion of the part and to stabilize the dimensional accuracy and the material.

Generally, if the tempering temperature is lower than 100° C., the above effects are not obtained, and if it exceeds 300° C., the hardened layer is markedly softened, which leads to a concern about the decrease in fatigue strength. Accordingly, the low-temperature tempering is performed in a range of 100° C. to 300° C. in many cases. Needless to say, for the surface layer hardened steel part of the present invention, the low-temperature tempering can also be performed after the carburizing quenching, just like the general case.

A preferable temperature of the quenching of the present invention is 120° C. to 200° C., and a preferable time is 30 to 180 minutes.

In the method according the present invention, the temperature region of the high carbon gas carburizing or the high carbon gas carbonitriding treatment is to 800° C. to 900° C. After the high carbon gas carburizing or the high carbon gas carbonitriding treatment, the quenching is performed from a temperature at which the carburizing treatment is conducted or from a temperature which is lowered below the temperature of the carburizing. The reason for this will be described.

In the present invention, it is possible to improve the tooth surface fatigue strength of the part without performing the secondary quenching for finely dispersing the carbide (without deteriorating the dimensional accuracy of the part). For this, during the high-temperature carburizing treatment, it is necessary that the carbide formed in the carburized layer is controlled to the morphology such that a large amount of the carbide is finely dispersed. Regarding the carbide formed in the carburized layer during the high carbon carburizing treatment, the lower the carburizing temperature, the finer the precipitate thereof, and grain-like or needle-like fine carbides are dispersed in the austenite grains.

When the steel having the chemical composition according to the present invention is treated with the high carbon carburizing, the lower the carburizing temperature, the easier the fine $(Cr,Fe)_{23}C6$ and/or $(Cr,Fe)_3C$ is precipitated and the amount of the precipitates also increases in the austenite grains in the carburized layer, at the initial stage of the carburizing treatment. Moreover, at the late stage of the carburizing treatment, cementite is precipitated by using the fine precipitates as nuclei thereof.

By the above treatment, the amount of the coarse reticular cementite formed along the austenite grain boundary is also suppressed. Particularly, when the carburizing temperature is 900° C. or lower, it is possible to obtain a microstructure in which the carbide is sufficiently dispersed. In addition, the lower the carburizing temperature, the more the precipitation amount of the all of the carbide; therefore, this is advantageous for improving the tooth surface fatigue strength.

On the other hand, if the carburizing temperature is lowered excessively, the time taken for obtaining a desired depth of the layer hardened by carburizing is prolonged. The productivity decreases. Accordingly, in the present invention, the temperature for performing the carburizing treatment needs to be in a range of 800° C. to 900° C. A preferable temperature range for performing the carburizing treatment is 820° C. to 880° C.

In the general technique, when the quenching is performed after the carburizing, the quenching is performed after a temperature is lowered to a certain degree lower than the carburizing treatment, for the purpose of reducing the heat-treatment shape change of the part. In the carburizing treatment according to the present invention, since the carburizing temperature thereof is low, the temperature does not need to be lowered, and the problem does not occur even if the quenching is performed from the temperature of the carburizing treatment.

If it is necessary to reduce the heat-treatment shape change, the quenching may be performed after the temperature is lowered to a temperature lower than the carburizing temperature. However, when the temperature is lowered excessively, a problem arises in the safeness of the control and atmosphere of C.P. A preferable range of the quenching start temperature is 760° C. to 850° C.

The method of manufacturing the surface layer hardened steel part according to the present invention may further include a pre-carburizing process in which the gas carburizing treatment or the carbonitriding treatment is performed on the steel part under a condition of a temperature region of 800° C. to 1100° C. and carbon potential of the carburizing atmosphere of 0.40% to 1.20%, prior to the high carbon carburizing treatment as described above performed at 800° C. to 900° C.

As described above, if the high carbon carburizing treatment is performed, the lower the carburizing temperature, the easier the fine $(Cr,Fe)_{23}C_6$ and/or $(Cr,Fe)_3C$ is precipitated and the amount of precipitates also increases in the austenite grains in the carburized layer, at the initial stage of the carburizing treatment. Moreover, at the late stage of the carburizing treatment, cementite is precipitated by using the fine precipitates as nuclei thereof.

On the other hand, when the carburizing temperature is low, a diffusion distance of the carbon is short. Accordingly, this causes a drawback such that the depth of an effective hardened layer becomes shallow, and that the carburizing time for obtaining a desired depth of the effective hardened layer is prolonged. However, it is possible to perform the pre-carburizing process prior to the low-temperature high carbon carburizing treatment. Regardless of the carburizing condition, the pre-carburizing process does not negatively influence the low-temperature and high-concentration carburizing treatment performed thereafter, as long as the coarse reticular cementite is not precipitated under the carburizing condition. Accordingly, in order to diffuse the carbide to a deeper position, the carburizing or the carbonitriding may be performed at first under a general condition, and then the high-concentration carburizing or the high-concentration carbonitriding treatment may be performed after the temperature is lowered to a range of 800° C. to 900° C. In this case, since the improvement of the depth of the effective carburized layer is compatible with the improvement of the tooth surface fatigue strength caused by the high-concentration carburizing, it is possible to reduce the carburizing time, which results in the improvement of the productivity. Under general carburizing conditions, the carburizing needs to be performed in a temperature range of 800° C. to 1100° C. The effect of improving the depth of the hardened layer is not obtained at a temperature lower than 800° C., which thus is meaningless. If the temperature exceeds 1100° C., the grains coarsen markedly, so the property of the carburized part deteriorates. A preferable temperature range is 900° C. to 1000° C. The carburizing needs to be performed under a condition of the carbon potential of the carburizing atmosphere of 0.40% to 1.20%. If the carbon potential is less than 0.40%, the effect of improving the depth of the carburized layer is small, and if it exceeds 1.20%, the coarse reticular cementite is precipitated before the low-temperature and high-concentration carburizing treatment is performed and is not removed thereafter. So the property of the carburized part deteriorates. A preferable range of the carbon potential is 0.60% to 1.00%.

In the method of manufacturing the surface layer hardened steel part according to the present invention, the $(Cr,Fe)_{23}C_6$ and/or $(Cr,Fe)_3C$ is precipitated in the carburized layer during the high carbon and low temperature carburizing treatment.

As described above, when the high carbon carburizing treatment is performed on the steel of the present invention, the fine $(Cr,Fe)_{23}C_6$ and/or $(Cr,Fe)_3C$ is precipitated in the austenite grains in the carburized layer, at the initial stage of the carburizing treatment. At the late stage of the carburizing treatment, the cementite is precipitated by using the fine precipitates as nuclei thereof, and as a result, it is possible to control the carbide formed in the carburize layer to the morphology such that a large amount of the carbide is finely dispersed.

As a result, the amount of the coarse reticular cementite formed along the austenite grain boundary is also suppressed. Consequently, it is necessary to precipitate the $(Cr,Fe)_{23}C_6$ and/or $(Cr,Fe)_3C$ in the carburized layer during the carburizing treatment. The $(Cr,Fe)_{23}C_6$ referred to herein is carbide having Cr and Fe as main constituent elements. However, the $(Cr,Fe)_{23}C_6$ is not restricted to include only Cr and Fe but may include other alloy elements such as Mo and Mn.

The surface-hardened part manufactured from the steel of the present invention may be conducted to a shot peening treatment after the carburizing treatment. The increase in compressive residual stress of the surface layer of the part introduced by the shot peening treatment suppresses the initiation and propagation of the fatigue cracks. Therefore, the increase can further improve the fatigue strength of dedendum and the tooth surface of the part manufactured from the steel of the present invention. It is preferable that the shot peening treatment is performed by using shot particles having a diameter of 0.7 mm or less under a condition of an arc height of 0.4 mm or more.

Example

Next, examples of the present invention will be described. However, the condition in the examples is an example condition employed to confirm the operability and the effects of the present invention, so the present invention is not limited to the example condition. The present invention can employ various types of conditions as long as the conditions do not depart from the scope of the present invention and can achieve the object of the present invention.

Example

Steels made molten by a converter having the component composition shown in Tables 1 and 2 were subjected to a continuous casting, a soaking diffusion treatment as necessary, and then a blooming rolling, thereby a rolling material of 162 mm square was manufactured. Thereafter, through hot rolling, the rolling material was shaped into a steel bar of 35 mm in diameter.

TABLE 1

| Steel No. | C | Si | Mn | P | S | Cr | N | O | Cr + Si + Mn | Remarks |
|---|---|---|---|---|---|---|---|---|---|---|
| A | 0.20 | 0.25 | 0.85 | 0.015 | 0.015 | 2.50 | 0.0135 | 0.0015 | 0.36 | Steel of the |
| B | 0.20 | 0.25 | 0.80 | 0.012 | 0.0001 | 3.00 | 0.0080 | 0.0024 | 4.05 | present |
| C | 0.20 | 0.23 | 0.80 | 0.015 | 0.015 | 2.25 | 0.0150 | 0.0015 | 3.28 | invention |
| D | 0.60 | 0.01 | 0.52 | 0.005 | 0.100 | 2.00 | 0.0140 | 0.0026 | 2.53 | |
| E | 0.10 | 2.50 | 0.20 | 0.010 | 0.010 | 5.00 | 0.0120 | 0.0020 | 7.70 | |
| F | 0.15 | 0.33 | 0.55 | 0.008 | 0.015 | 2.75 | 0.0130 | 0.0025 | 3.63 | |
| G | 0.19 | 0.50 | 2.00 | 0.010 | 0.012 | 2.45 | 0.0125 | 0.0001 | 4.95 | |
| H | 0.30 | 0.10 | 0.41 | 0.012 | 0.028 | 2.10 | 0.0135 | 0.0020 | 2.61 | |
| I | 0.18 | 0.79 | 0.35 | 0.006 | 0.015 | 2.25 | 0.0100 | 0.0025 | 3.39 | |
| J | 0.22 | 0.40 | 0.50 | 0.0001 | 0.011 | 2.50 | 0.0020 | 0.0013 | 3.40 | |
| K | 0.20 | 1.00 | 0.30 | 0.010 | 0.025 | 2.35 | 0.0145 | 0.0021 | 3.65 | |
| L | 0.20 | 0.05 | 0.55 | 0.008 | 0.018 | 2.60 | 0.0060 | 0.0030 | 3.20 | |
| M | 0.15 | 0.35 | 0.65 | 0.016 | 0.015 | 2.90 | 0.0149 | 0.0022 | 3.90 | |
| T | 0.18 | 0.25 | 0.86 | 0.011 | 0.016 | 2.52 | 0.0133 | 0.0011 | 3.63 | |
| U | 0.20 | 0.55 | 0.79 | 0.012 | 0.013 | 3.03 | 0.0077 | 0.0008 | 4.37 | |
| V | 0.19 | 0.63 | 1.69 | 0.013 | 0.018 | 2.24 | 0.0155 | 0.0013 | 4.56 | |
| W | 0.20 | 1.35 | 0.52 | 0.010 | 0.017 | 2.00 | 0.0125 | 0.0017 | 3.87 | |
| X | 0.20 | 0.41 | 0.40 | 0.009 | 0.029 | 4.95 | 0.0139 | 0.0013 | 5.76 | |
| N | 0.22 | 0.25 | 0.80 | 0.015 | 0.015 | 1.05 | 0.0135 | 0.0015 | 2.10 | Comparative |
| O | 0.19 | 0.98 | 0.83 | 0.010 | 0.016 | 1.85 | 0.0101 | 0.0015 | 3.66 | steel |
| P | 0.05 | 1.01 | 0.84 | 0.009 | 0.012 | 2.45 | 0.0103 | 0.0015 | 4.30 | |
| Q | 0.23 | 2.81 | 0.99 | 0.013 | 0.008 | 2.77 | 0.0087 | 0.0009 | 6.57 | |
| R | 0.23 | 0.55 | 2.42 | 0.006 | 0.016 | 2.22 | 0.0157 | 0.0008 | 5.19 | |
| S | 0.23 | 1.10 | 0.85 | 0.009 | 0.019 | 5.44 | 0.0156 | 0.0018 | 7.39 | |
| Y | 0.20 | 2.00 | 1.60 | 0.015 | 0.015 | 4.50 | 0.0130 | 0.0014 | 8.10 | |

TABLE 2

| Steel No. | Mo | Ni | Cu | V | Ti | Nb | Al | B | Ca | Mg | Zr | Remarks |
|---|---|---|---|---|---|---|---|---|---|---|---|---|
| A | 0.40 | 0.05 | — | — | — | — | 0.035 | — | — | — | — | Steel of the |
| B | 0.40 | — | — | — | — | — | 0.110 | — | — | — | — | present |
| C | 0.39 | — | — | — | — | — | 0.025 | — | — | — | — | invention |
| D | 1.00 | — | — | — | — | — | 0.045 | — | 0.0010 | — | — | |
| E | — | — | — | — | — | — | 0.025 | — | 0.0008 | — | — | |
| F | 0.01 | 0.15 | 0.30 | — | — | — | 0.035 | — | — | — | — | |
| G | 0.15 | — | — | — | — | — | 0.021 | — | — | — | — | |

TABLE 2-continued

| Steel No. | Mo | Ni | Cu | V | Ti | Nb | Al | B | Ca | Mg | Zr | Remarks |
|---|---|---|---|---|---|---|---|---|---|---|---|---|
| H | 0.35 | — | — | — | — | — | 0.030 | — | — | — | — | |
| I | — | 2.00 | — | — | — | — | 0.045 | — | — | — | — | |
| J | 0.40 | — | — | — | 0.130 | — | 0.001 | 0.0020 | — | — | — | |
| K | 0.05 | 0.40 | — | 0.20 | — | — | 0.040 | — | — | — | — | |
| L | 0.42 | — | 0.05 | — | — | — | 0.500 | — | — | — | — | |
| M | 0.40 | — | — | — | — | 0.0250 | 0.030 | — | — | — | — | |
| T | 0.35 | — | — | — | — | — | 0.033 | — | 0.0008 | 0.0005 | 0.0005 | |
| U | 0.27 | 0.04 | — | — | — | — | 0.113 | — | 0.0030 | — | — | |
| V | 0.15 | — | 0.05 | — | — | — | 0.037 | — | — | 0.0008 | — | |
| W | 0.67 | — | — | — | — | — | 0.041 | — | 0.0005 | 0.0030 | — | |
| X | — | — | — | — | — | — | 0.028 | — | 0.0010 | — | 0.0012 | |
| N | 0.16 | — | — | — | — | — | 0.035 | — | — | — | — | Comparative steel |
| O | — | — | — | — | — | — | 0.024 | — | — | — | — | |
| P | 0.20 | — | — | — | — | — | 0.032 | — | — | — | — | |
| Q | 0.40 | — | — | — | — | — | 0.038 | — | — | — | — | |
| R | — | 0.13 | 0.10 | — | — | — | 0.031 | — | — | — | — | |
| S | — | — | — | — | — | 0.030 | 0.029 | — | — | — | — | |
| Y | 0.40 | — | — | — | — | — | 0.030 | — | — | — | — | |

In Tables 1 and 2, "—" of each element means that the element was not added. The underline in the tables means that the value is out of the range of the present invention.

Next, to simulate the gear-manufacturing process (thermal history), hot forging was simulated under a condition such that the steel for hot rolling was heated at 1250° C. for 30 minutes and then air-cooled. Subsequently, a normalizing treatment was performed under a condition such that the steel was heated at 925° C. for 60 minutes and then gradually cooled. From the material produced in the processes, 20 pieces of roller pitting test specimens having a large diameter portion (test portion) of 26φ, and 20 pieces of smooth specimens for Ono-type rotary bending fatigue test having a smooth portion of 8φ were produced by machining.

Figure 1A:
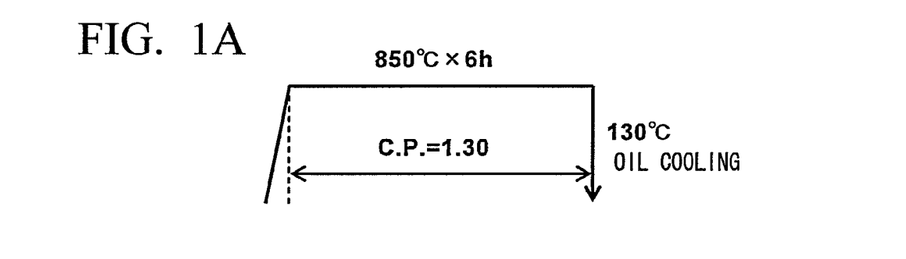
FIG. 1A is a view illustrating a carburizing condition according to an embodiment of the invention.
Figure 1B:
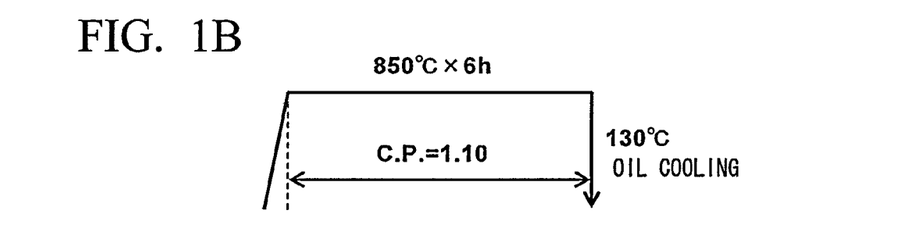
FIG. 1B is a view illustrating a carburizing condition according to an embodiment of the invention.
Figure 1C:
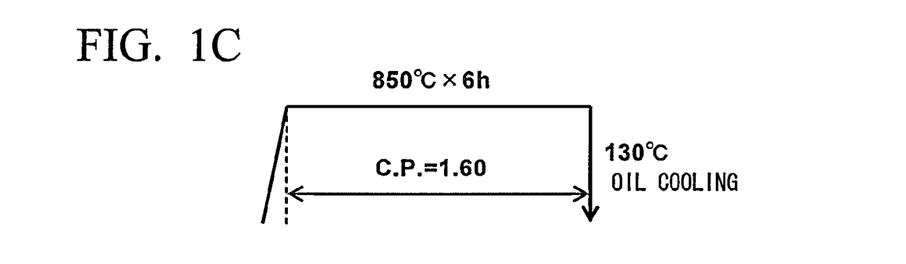
FIG. 1C is a view illustrating a carburizing condition according to an embodiment of the invention.
Figure 1D:
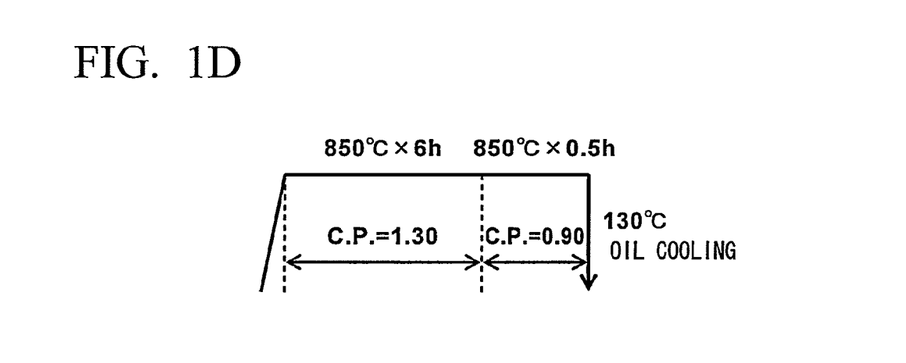
FIG. 1D is a view illustrating a carburizing condition according to an embodiment of the invention.
Figure 1E:
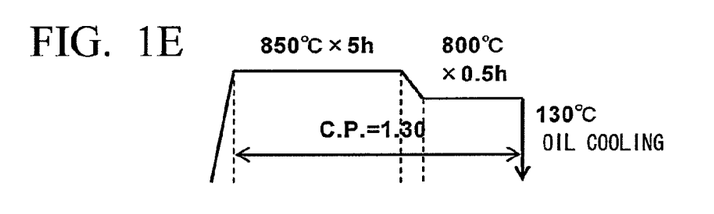
FIG. 1E is a view illustrating a carburizing condition according to an embodiment of the invention.
Figure 1F:
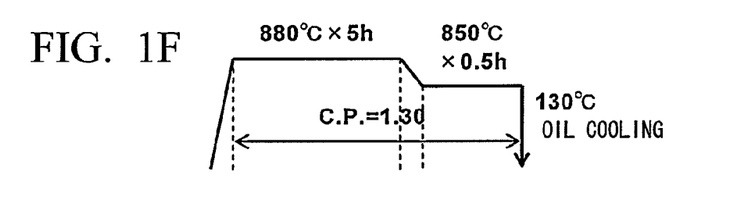
FIG. 1F is a view illustrating a carburizing condition according to an embodiment of the invention.
Figure 1G:
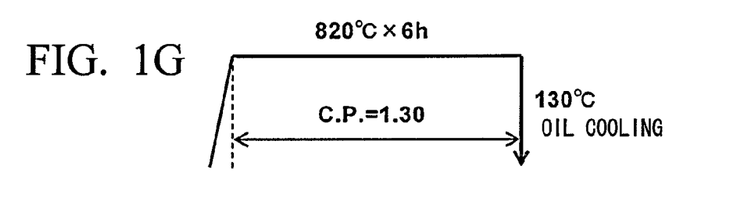
FIG. 1G is a view illustrating a carburizing condition according to an embodiment of the invention.
Figure 1H:
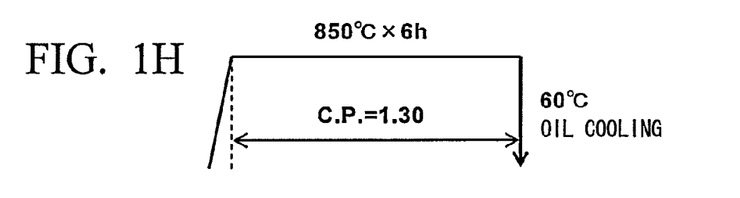
FIG. 1H is a view illustrating a carburizing condition according to an embodiment of the invention.
Figure 1I:
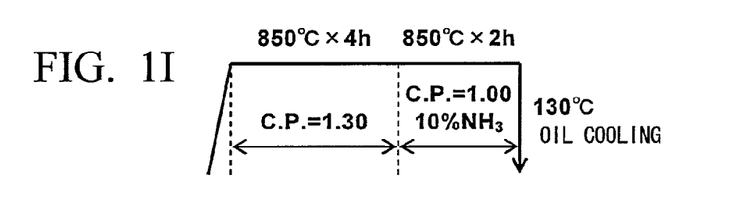
FIG. 1I is a view illustrating a carburizing condition according to an embodiment of the invention.
Figure 1K:
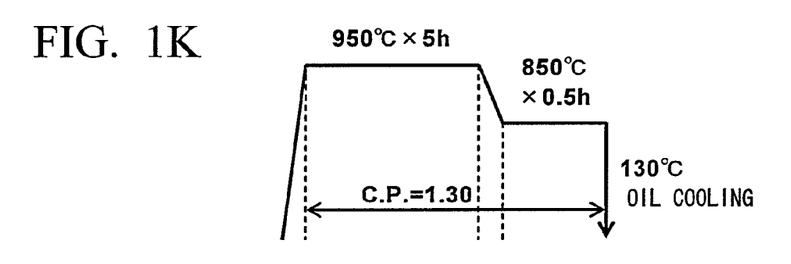
FIG. 1K is a view illustrating a carburizing condition according to a comparative example of the invention.
Figure 1L:
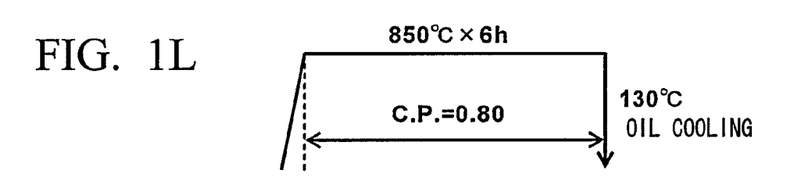
FIG. 1L is a view illustrating a carburizing condition according to the comparative example of the invention.
Figure 1M:
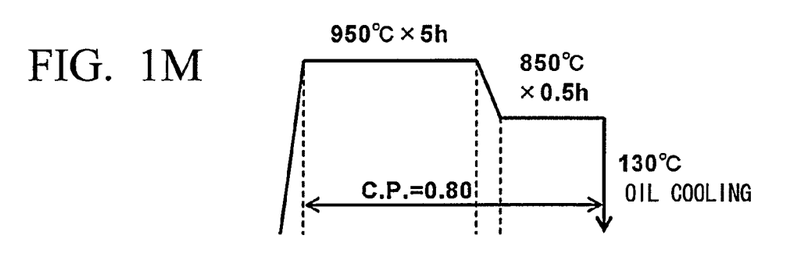
FIG. 1M is a view illustrating a carburizing condition according to the comparative example of the invention.
Figure 1N:
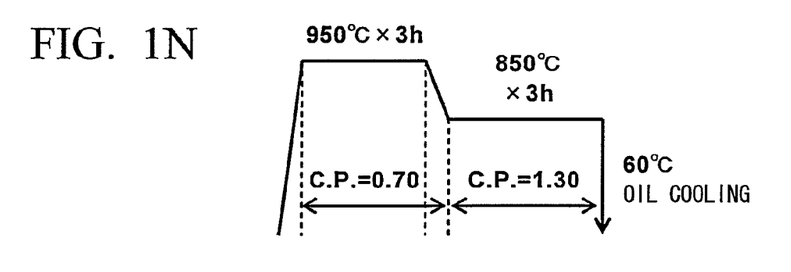
FIG. 1N is a view illustrating a carburizing condition according to an embodiment of the invention.
Figure 1O:
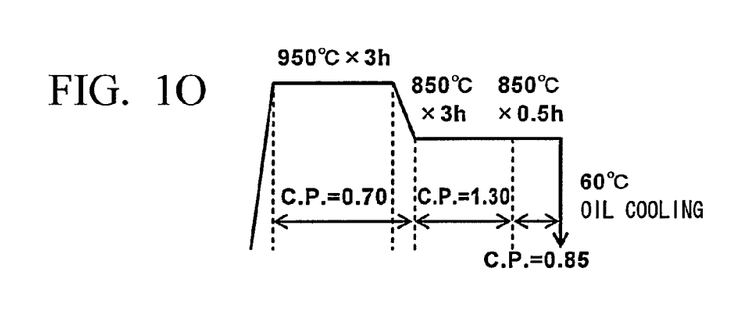
FIG. 1O is a view illustrating a carburizing condition according to an embodiment of the invention.

The prepared test specimens were subjected to the carburizing treatment or the gas carbonitriding treatment of the patterns shown in FIGS. 1A to 1O. FIGS. 1A to 1I and FIGS. 1N to 1O are carburizing patterns according to the invention, and FIGS. 1K, 1L, and 1M are comparative carburizing patterns. After the carburizing, tempering was performed under a condition such that all specimens were heated at 150° C. for 90 minutes and then air-cooled. Subsequently, in order to improve the accuracy of the fatigue test, grip portions of the roller pitting test specimens and the smooth specimens for the Ono-type rotary bending fatigue test were subjected to a finish machining.

Among the roller pitting test specimens of each test level, one specimen was cut at the large diameter portion, and the microstructure of the cross section was observed. For the microstructure observation, the cross section was mirror-polished and then subjected to nital corrosion. An optical micrograph of the specimen was taken at 400-fold to 1000-fold magnification, and then the area ratio of the carbide from the surface to the position of 50 µm in depth was measured by using an image analyzer.

In addition, the microstructure observation was performed from the topmost surface to 200 µm in depth, and if reticular cementite exists along the prior γ grain boundary, which was judged as "reticular carbide is present". For the judgement, five visual fields were examined per each sample; herein the visual field corresponds to 0.5 mm² at 400-fold magnification in the above-described observation position. As the Judging criteria, if even one visual field which has 5 pieces or more of carbides having a length of 10 µm or more at the prior γ grain boundary is detected, which was judged as "reticular carbide is present". When "reticular carbide is present" is judged in this manner, the average density of the reticular carbide becomes 2.5 carbides/mm².

Figure 2A:
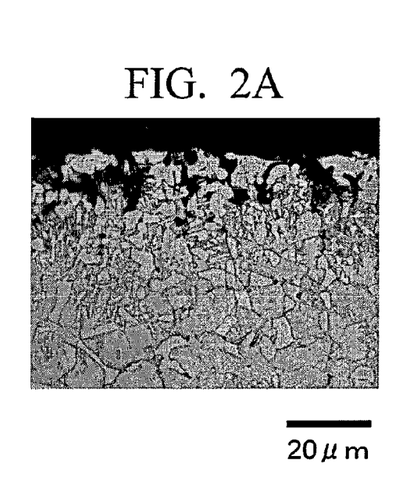
FIG. 2(A) is a micrograph illustrating an example of the microstructure of a carburized layer in high carbon carburizing according to a conventional technique and illustrating a microstructure where reticular cementite exists.
Figure 2B:
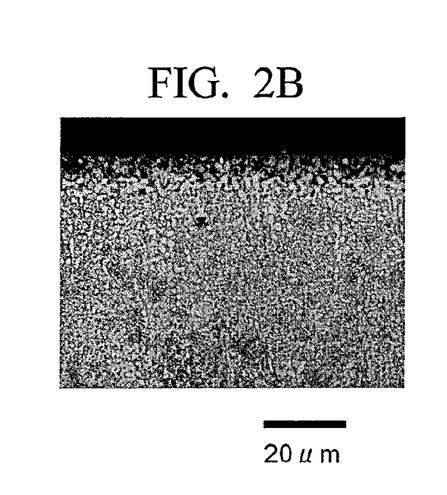
FIG. 2(B) is a micrograph illustrating an example of the microstructure of a carburized layer in high carbon carburizing according to an embodiment of the invention and illustrating an excellent high carbon carburizing microstructure in which the reticular cementite does not exist and a large amount of a fine carbide is dispersed.

FIG. 2(A) shows an example of the microstructure where the reticular cementite exists, and FIG. 2(B) shows an example of an excellent high carbon carburizing microstructure where the reticular cementite does not exist, and a large amount of carbides is dispersed finely.

Figure 3:
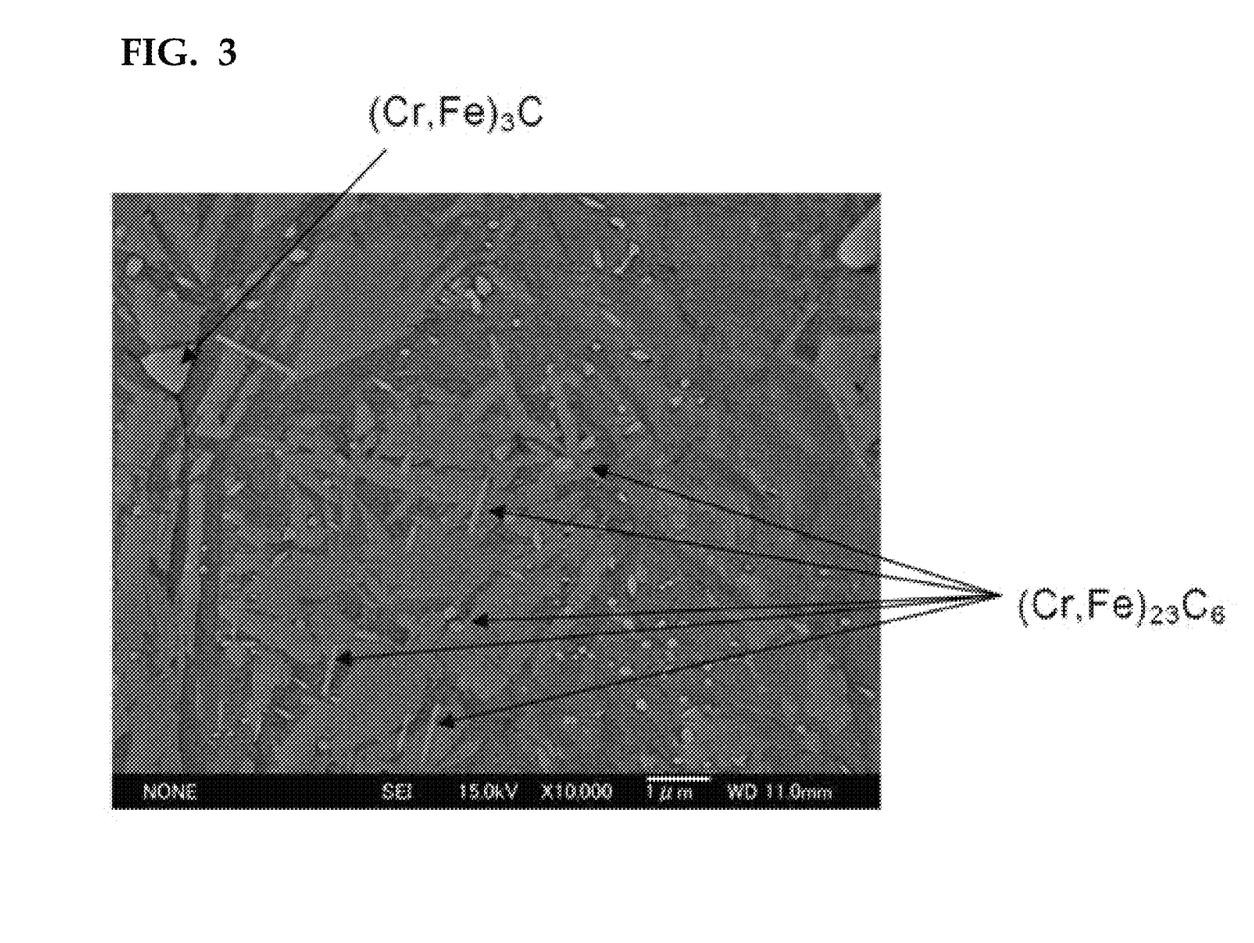
FIG. 3 is a micrograph illustrating a microstructure in which $(Cr,Fe)_{23}C_6$ and $(Cr,Fe)_3C$ are precipitated.

The test specimens for the microstructure observation were also observed by using SEM, the fine precipitates from the surface to a position of 50 µm depth were observed, and compositional analysis was performed by using EDS. Furthermore, the fine precipitate which was prepared by an extraction replica method was observed by TEM, and the precipitate was identified by electron diffraction. As a result of the identification, if 100 pieces or more precipitates of $(Cr,Fe)_{23}C_6$ and/or $(Cr,Fe)_3C$ was confirmed per 100 µm², which was judged as "$(Cr,Fe)_{23}C_6$ or $(Cr,Fe)_3C$ is present". FIG. 3 shows an example in which $(Cr,Fe)_{23}C_6$ and $(Cr,Fe)_3C$ are precipitated in the carburized layer.

The roller pitting test was performed under a condition of a big roller: SCM 420 carburized product-crowning 150R, frequency of rotation: 2000 rpm, lubricant oil: transmission oil, oil temperature of 80° C., slip ratio of 40%, and the maximum number of the test of ten million times, and the fatigue limit was determined by creating an S-N diagram, whereby the roller pitting fatigue strength was determined. A specimen whose roller pitting fatigue strength did not reach 3000 MPa was judged to have poor tooth surface fatigue strength.

The smooth Ono-type rotary bending fatigue test was performed under a condition of frequency of rotation: 3000 rpm, and the fatigue limit was determined by creating the S-N diagram, whereby the rotary bending fatigue strength was determined. A specimen whose smooth Ono-type rotary bending fatigue did not reach 600 MPa was judged to have poor dedendum bending fatigue strength.

The evaluated results were shown in Table 3. All of the examples of the inventions of Manufacture Nos. 1 to 21 and Manufacture Nos. 31 to 45 achieved the target, and had excellent tooth surface fatigue strength and sufficient rotary bending fatigue strength. Since Manufacture No. 9 had been treated with carbonitriding treatment in addition to the high carbon carburizing, the roller pitting fatigue strength thereof was particularly high.

TABLE 3

| Manufacture No. | Steel No. | Carburizing pattern | Area ratio of carbide % | $(Cr,Fe)_{23}C_6$ or $(Cr,Fe)_3C$ precipitation | Reticular carbide | Roller pitting fatigue strength MPa | Rotary bending fatigue strength MPa | Remark |
|---|---|---|---|---|---|---|---|---|
| 1 | A | (a) | 50 | Present | Absent | 3840 | 820 | Example of present invention |
| 2 | A | (b) | 26 | Present | Absent | 3440 | 660 | |
| 3 | A | (c) | 78 | Present | Absent | 3900 | 760 | |
| 4 | A | (d) | 45 | Present | Absent | 3800 | 740 | |
| 5 | A | (e) | 60 | Present | Absent | 3840 | 740 | |
| 6 | A | (f) | 55 | Present | Absent | 3820 | 760 | |
| 7 | A | (g) | 55 | Present | Absent | 3780 | 780 | |
| 8 | A | (h) | 50 | Present | Absent | 3880 | 800 | |
| 9 | A | (i) | 45 | Present | Absent | 4200 | 780 | |
| 10 | B | (a) | 60 | Present | Absent | 3800 | 820 | |
| 11 | C | (a) | 47 | Present | Absent | 3760 | 800 | |
| 12 | D | (a) | 40 | Present | Absent | 3700 | 820 | |
| 13 | E | (a) | 71 | Present | Absent | 3860 | 700 | |
| 14 | F | (a) | 57 | Present | Absent | 3800 | 680 | |
| 15 | G | (a) | 50 | Present | Absent | 3820 | 680 | |
| 16 | H | (a) | 42 | Present | Absent | 3780 | 760 | |
| 17 | I | (a) | 48 | Present | Absent | 3820 | 800 | |
| 18 | J | (a) | 55 | Present | Absent | 3900 | 740 | |
| 19 | K | (a) | 53 | Present | Absent | 3860 | 780 | |
| 20 | L | (a) | 54 | Present | Absent | 3740 | 780 | |
| 21 | M | (a) | 63 | Present | Absent | 3800 | 800 | |
| 31 | T | (a) | 53 | Present | Absent | 3820 | 760 | |
| 32 | T | (b) | 57 | Present | Absent | 3840 | 720 | |
| 33 | T | (c) | 77 | Present | Absent | 3940 | 680 | |
| 34 | T | (d) | 42 | Present | Absent | 3760 | 760 | |
| 35 | T | (e) | 61 | Present | Absent | 3860 | 780 | |
| 36 | T | (f) | 57 | Present | Absent | 3840 | 700 | |
| 37 | T | (g) | 54 | Present | Absent | 3820 | 840 | |
| 38 | T | (h) | 48 | Present | Absent | 3780 | 800 | |
| 39 | T | (i) | 44 | Present | Absent | 3780 | 740 | |
| 40 | T | (n) | 56 | Present | Absent | 3840 | 760 | |
| 41 | T | (o) | 15 | Present | Absent | 3600 | 620 | |
| 42 | U | (a) | 58 | Present | Absent | 3850 | 780 | |
| 43 | V | (a) | 55 | Present | Absent | 3840 | 760 | |
| 44 | W | (a) | 45 | Present | Absent | 3780 | 820 | |
| 45 | X | (a) | 69 | Present | Absent | 3900 | 680 | |
| 22 | A | <u>(m)</u> | <u>0</u> | <u>Absent</u> | Absent | <u>2680</u> | 620 | Comparative example |
| 23 | A | <u>(k)</u> | 65 | Present | <u>Present</u> | <u>2620</u> | <u>420</u> | |
| 24 | A | <u>(l)</u> | <u>0</u> | <u>Absent</u> | Absent | <u>2600</u> | 600 | |
| 25 | <u>N</u> | (a) | <u>13</u> | <u>Absent</u> | <u>Present</u> | <u>2520</u> | <u>400</u> | |
| 26 | <u>O</u> | (a) | <u>21</u> | Present | <u>Present</u> | <u>2560</u> | <u>420</u> | |
| 27 | <u>P</u> | (a) | 47 | Present | Absent | 3200 | <u>400</u> | |
| 28 | <u>Q</u> | (a) | <u>0</u> | <u>Absent</u> | Absent | <u><2000</u> | <u>380</u> | |
| 29 | <u>R</u> | (a) | <u>8</u> | <u>Absent</u> | Absent | <u><2000</u> | <u>380</u> | |
| 30 | <u>S</u> | (a) | <u>12</u> | Present | Absent | <u><2000</u> | <u>400</u> | |
| 46 | <u>Y</u> | (a) | <u>0</u> | <u>Absent</u> | Absent | <u>2600</u> | <u>400</u> | |

In Table 3, in columns of Steel No., Carburizing pattern, Area ratio of carbide, and presence or absence of $(Cr,Fe)_{23}C_6$ or $(Cr,Fe)_3C$ precipitation, the underline means that the value is out of the range of the present invention. The underline in the columns of presence or absence of Reticular carbide, Roller pitting fatigue strength, and Rotary bending fatigue strength means that the value does not achieved the target.

Meanwhile, in Manufacture No. 22, since the general carburizing pattern was used, the treatment temperature was high, and the C.P. was low. As a result, the carbide was not precipitated in the surface layer portion, and the roller pitting fatigue strength was insufficient.

In Manufacture No. 23, since the C.P. was high, the carbide was precipitated in the surface layer portion of the part. However, since the treatment temperature was high, the reticular cementite existed along the prior γ grain boundary. The reticular cementite decreased the fatigue strength, so both the roller pitting strength and the rotary bending fatigue strength were insufficient.

In Manufacture No. 24, though the treatment temperature was appropriate, the C.P. was low. As a result, the carbide was not precipitated in the surface layer portion of the part, and the roller pitting fatigue strength was insufficient.

In Manufacture Nos. 25 and 26, the amount of Cr added was smaller than the range of the present invention. As a result, the ratio of the carbide in the part was small, and the reticular cementite could not be suppressed. Consequently, both the roller pitting strength and the rotary bending fatigue strength were insufficient.

In Manufacture No. 27, the carbide was precipitated sufficiently in the surface layer portion, and the reticular cementite could be suppressed. As a result, the roller pitting fatigue strength was excellent. On the other hand, since the amount of C in the material was too small, the hardness of the core portion was low, and the rotary bending fatigue strength was insufficient.

In Manufacture No. 28, 29, and 30, the amount of Si, Mn, and Cr added respectively was larger than the range of the present invention. As a result, a composite oxide of Cr, Si, and Mn was formed on the steel surface during the gas carburizing, the carbon content in the carburized layer was markedly reduced, and as a result, the amount of carbide precipitated was insufficient. Moreover, the hardness of the surface layer for the carburized part was insufficient, and both the roller pitting strength and the rotary bending fatigue strength were insufficient.

In Manufacture No. 46, since the total amount of Cr, Si, and Mn added in the steel was too large, a composite oxide of Cr, Si, and Mn was formed on the steel surface during the gas carburizing, and the carbon content on the surface did not increase at all even after the carburizing treatment. Consequently, the carbide was not precipitated at all, the hardness of the surface layer for the carburized part was insufficient, and both the roller pitting strength and the rotary bending fatigue strength were insufficient.

INDUSTRIAL APPLICABILITY

As described above, according to the present invention, it is possible to finely disperse carbide in the carburized layer of a part, even if the secondary quenching is not performed. As a result, it is possible to obtain a part having a high tooth surface fatigue strength and avoiding the increase in heat-treatment shape change (deterioration of dimensional accuracy of a part) caused by the secondary quenching, with low cost. Therefore, the invention is very effective for increasing the frequency of rotation and transmission torque as well as the miniaturization and lightening of power transmission parts (for example, a gear, a bearing, a shaft, a CVT sheave, and the like) of automobiles and the like.

Therefore, through these effects, the present invention can enormously contribute not only to the performance upgrade of the conventional automobiles but to the dissemination and performance improvement of hybrid automobiles and electric automobiles. Accordingly, the present invention has significant industrial applicability.

The invention claimed is:

1. A surface layer-hardened steel part treated with a carburizing treatment or a carbonitriding treatment which includes a nitriding treatment at any given point in time during a total carburizing treatment time, a chemical composition of a steel of a non-carburized portion of the steel part comprising, by mass %:
C: 0.10% to 0.60%;
Si: 0.01% to 2.50%;
Mn: 0.20% to 2.00%;
S: 0.0001% to 0.100%;
Cr: 2.00% to 5.00%;
Al: 0.001% to 0.50%;
N: 0.0020% to 0.0200%;
P: 0.001% to 0.050%;
O: 0.0001% to 0.0030%; and
the balance consisting of iron and unavoidable impurities, wherein
a total amount of Cr, Si, and Mn of the non-carburized portion of the steel satisfies, by mass %, $2.0 \leqq Cr+Si+Mn \leqq 8.0$;
in a surface layer portion from the topmost surface to 50 μm in depth of a carburized layer, an area ratio of a carbide in the surface layer portion is 15% or more;
the surface layer portion contains at least one precipitate of $(Cr,Fe)_{23}C_6$ and $(Cr,Fe)_3C$ of 100 pieces or more per 100 μm²; and
a reticular carbide of 10 μm or more along a prior γ austenite grain boundary is 2.5 pieces/mm² or less in the surface layer portion.

2. The surface layer-hardened steel part according to claim 1, wherein the chemical composition of the non-carburized portion of the steel further comprises at least one of, by mass %:
Ca: 0.0005% to 0.0030%;
Mg: 0.0005% to 0.0030%; and
Zr: 0.0005% to 0.0030%.

3. The surface layer-hardened steel part according to claim 1 or 2, wherein the chemical composition of the non-carburized portion of the steel further comprises at least one of, by mass %:
Mo: 0.01% to 1.00%;
B: 0.0005% to 0.0050%;
Cu: 0.05% to 1.00%; and
Ni: 0.05% to 2.00%.

4. The surface layer-hardened steel part according to claim 1 or 2, wherein the chemical composition of the non-carburized portion of the steel further comprises at least one of, by mass %:
V: 0.005% to 0.50%;
Nb: 0.005% to 0.10%; and
Ti: 0.005% to 0.50%.

5. The surface layer-hardened steel part according to claim 3, wherein the chemical composition of the non-carburized portion of the steel further comprises at least one of, by mass %:
V: 0.005% to 0.50%;
Nb: 0.005% to 0.10%; and
Ti: 0.005% to 0.50%.

6. A method for producing a surface layer-hardened steel part, the method comprising:
a shape forming process of forming the steel part out of a steel for a surface layer hardening treatment, wherein a chemical composition of the steel comprises, by mass %,
C: 0.10% to 0.60%,
Si: 0.01% to 2.50%,
Mn: 0.20% to 2.00%,
S: 0.0001% to 0.10%,
Cr: 2.00% to 5.00%,
Al: 0.001% to 0.50%,
N: 0.0020% to 0.020%,
P: 0.001% to 0.050%,
O: 0.0001% to 0.0030%,
the balance consisting of iron and unavoidable impurities, and
a total amount of Cr, Si, and Mn satisfies, by mass %, $2.0 \leqq Cr+Si+Mn \leqq 8.0$;
a carburizing process of precipitating at least one precipitate of $(Cr,Fe)_{23}C_6$ and $(Cr,Fe)_3C$ of 100 pieces or more per 100 μm² in a carburized layer of the steel part in a temperature range of 800° C. to 850° C. by a gas carburizing treatment in which a carbon potential of a carburizing atmosphere keeps 0.90% or more through 50% or more of a total carburizing time or by a gas carbonitriding treatment in which a process to penetrate a nitrogen actively into the surface layer is added at any given point in time during the gas carburizing treatment in which the carbon potential keeps 0.90% or more through 50% or more of the total carburizing treatment time; and
a quenching process of quenching from a temperature at which the gas carburizing treatment or the gas carbonitriding treatment are conducted or quenching just after holding at a temperature which is below the carburizing temperature, following the carburizing process.

7. The method for producing the surface layer-hardened steel part according to claim 6, wherein the chemical composition further comprises at least one of, by mass %:
   Ca: 0.0005% to 0.0030%;
   Mg: 0.0005% to 0.0030%; and
   Zr: 0.0005% to 0.0030%.

8. The method for producing the surface layer-hardened steel part according to claim 6 or 7, wherein the chemical composition further comprises at least one of, by mass %:
   Mo: 0.01% to 1.00%;
   B: 0.0005% to 0.0050%;
   Cu: 0.05% to 1.00%; and
   Ni: 0.05% to 2.00%.

9. The method for producing the surface layer-hardened steel part according to claim 6 or 7, wherein the chemical composition further comprises at least one of, by mass %:
   V: 0.005% to 0.50%;
   Nb: 0.005% to 0.10%; and
   Ti: 0.005% to 0.50%.

10. The method for producing the surface layer-hardened steel part according to claim 6 or 7, wherein the method further comprises: prior to the carburizing process,
   a pre-carburizing process in which the gas carburizing treatment or the gas carbonitriding treatment is performed on the steel part in a temperature range of 800° C. to 1100° C. under a condition where the carbon potential of the carburizing atmosphere is 0.40% to 1.20%.

11. The method for producing the surface layer-hardened steel part according to claim 8, wherein the chemical composition further comprises at least one of, by mass %:
   V: 0.005% to 0.50%;
   Nb: 0.005% to 0.10%; and
   Ti: 0.005% to 0.50%.

12. The method for producing the surface layer-hardened steel part according to claim 8, wherein the method further comprises: prior to the carburizing process,
   a pre-carburizing process in which the gas carburizing treatment or the gas carbonitriding treatment is performed on the steel part in a temperature range of 800° C. to 1100° C. under a condition where the carbon potential of the carburizing atmosphere is 0.40% to 1.20%.

13. The method for producing the surface layer-hardened steel part according to claim 9, wherein the method further comprises: prior to the carburizing process,
   a pre-carburizing process in which the gas carburizing treatment or the gas carbonitriding treatment is performed on the steel part in a temperature range of 800° C. to 1100° C. under a condition where the carbon potential of the carburizing atmosphere is 0.40% to 1.20%.

14. The method for producing the surface layer-hardened steel part according to claim 11, wherein the method further comprises: prior to the carburizing process,
   a pre-carburizing process in which the gas carburizing treatment or the gas carbonitriding treatment is performed on the steel part in a temperature range of 800° C. to 1100° C. under a condition where the carbon potential of the carburizing atmosphere is 0.40% to 1.20%.

* * * * *